United States Patent
Sze et al.

(10) Patent No.: US 7,506,366 B1
(45) Date of Patent: Mar. 17, 2009

(54) INTEGRATING WORKSTATION COMPUTER WITH BADGING SYSTEM

(75) Inventors: Calvin Lui Sze, Austin, TX (US); Clifford Jay Spinac, Austin, TX (US); Glen Edmond Chalemin, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/037,989

(22) Filed: Feb. 27, 2008

(51) Int. Cl.
*G06F 7/04* (2006.01)
*G06F 7/58* (2006.01)
*G06F 15/16* (2006.01)
*G06F 17/30* (2006.01)
*G06K 9/00* (2006.01)
*G06K 19/00* (2006.01)
*H04L 9/32* (2006.01)

(52) U.S. Cl. ........................................................ 726/5
(58) Field of Classification Search ....................... 726/5
See application file for complete search history.

(56) References Cited

U.S. PATENT DOCUMENTS

| | | | | |
|---|---|---|---|---|
| 5,799,098 A | * | 8/1998 | Ort et al. | 382/125 |
| 6,035,398 A | * | 3/2000 | Bjorn | 713/186 |
| 7,062,582 B1 | * | 6/2006 | Chowdhuri | 710/116 |
| 2005/0160162 A1 | | 7/2005 | Cromer et al. | |
| 2006/0198518 A1 | * | 9/2006 | Iwatsu et al. | 380/201 |
| 2006/0198524 A1 | * | 9/2006 | Sexton | 380/277 |
| 2007/0011116 A1 | * | 1/2007 | Vauclair | 706/16 |
| 2007/0016784 A1 | * | 1/2007 | Vauclair | 713/176 |
| 2007/0038861 A1 | * | 2/2007 | Weber et al. | 713/176 |
| 2007/0050645 A1 | | 3/2007 | Siegmund | |
| 2007/0192579 A1 | | 8/2007 | Lee et al. | |
| 2008/0028053 A1 | | 1/2008 | Kelley et al. | |

OTHER PUBLICATIONS

"RSHUT PRO-Remote Auto Shutdown and Wake UP on LAN manager", RTSECURITY.com, http://www.rshut.com/index.php, 2 pages.
"WOL: Wake-on-LAN Tutorial with Bonus PHP Script—hacker not cracker", http://www.hackernotcracker.com/2006-04/wol-wake-on-lan-tutorial-with-bonus-php-script-html, 11 pages.

* cited by examiner

*Primary Examiner*—Kambiz Zand
*Assistant Examiner*—Farid Homayounmehr
(74) *Attorney, Agent, or Firm*—MaxValueIP, LLC

(57) ABSTRACT

In one embodiment, a Wake-On-LAN (WOL) signal is sent to power-up and boot the workstation when the employees badge into the site in order to save time for the employees. The workstation boots up into the operating system as the employees arrive at the office area. Upon badging into their office area or building, a database matches the badge number with the MAC address of their corresponding workstations. Then a WOL signal with that MAC address is sent to power-up the particular workstations. In an embodiment, upon badging out, the same procedure is triggered to shutdown the machine or performs any other tasks based on a predetermined configuration. If two or more employees use the same computer, the computer is turned on when either employee badges into the site. This embodiment groups the employees in a group entity and keeps track of the individuals within the group.

1 Claim, 2 Drawing Sheets

INTEGRATING WORKSTATION COMPUTER WITH BADGING SYSTEM

BACKGROUND OF THE INVENTION

While some workstations and servers are not routinely shut-down, most of the desktop computers used in regular offices are shut-down at the end of the day for energy saving purposes. As a result, generally, when people arrive at their offices each day, the first task they remember to do is powering on their desktop computers or workstations, in order to let it boot up and do the initial tasks such as updating the virus protection program or antispyware programs and running preliminary system checks or virus scans. The initial tasks can also comprise applying certain patches, recognizing software licenses, or even starting desktop mail-checking software such as Outlook® and executing some rules. Furthermore, operating systems, corporations, or individuals can add more tasks to be executed before a system is fully ready for work.

The total time a computer system requires to get "ready" can, therefore, be considerable. The significance of this problem becomes even clearer when a user forgets about starting up his/her computer upon entering the office and sometime, later on the day, an urgent need to use the computer comes up while the computer is still in shut-down status.

One way is to tackle this issue is mentioned in this invention, and that is to find a method to have the computers booted up and ready by the time the users reach them. This invention addresses this problem by having the computer start booting up once the corresponding users enter the office building.

SUMMARY OF THE INVENTION

In one embodiment, the workstations are networked on a local area network (LAN). A Wake-on-LAN (WOL) signal is sent to power-up and boot the workstation when the employees badge into the site, office building, or work area, without requiring them to wait for the computers to start up after getting to the work area and, therefore, to save some of their time. When an employee badges into its office area or building, a database matches its badge number with the Media Access Control (MAC) address of its workstation, and then a Wake on LAN (WOL) signal with that MAC address is sent to power-up (or wake up) his/her particular workstation. In one embodiment, similar steps are taken when the employee is badging out of the site to shutdown or set employee's workstation to any other predetermined setting based on a configuration chosen for that machine and the employee. In another embodiment, if two employees use the same computer, the computer is turned on when either employee badges into the site. On badge-out, it will take both employees badging out (if they had both badged in), to shut down the computer or set it to other settings per configuration for the machine. This embodiment groups the employees in a group entity and keeps track of the individuals within the group via badging system. This is also applicable to groups with more than two individuals.

DETAILED DESCRIPTION OF THE PREFERRED EMBODIMENTS

Figure 1:
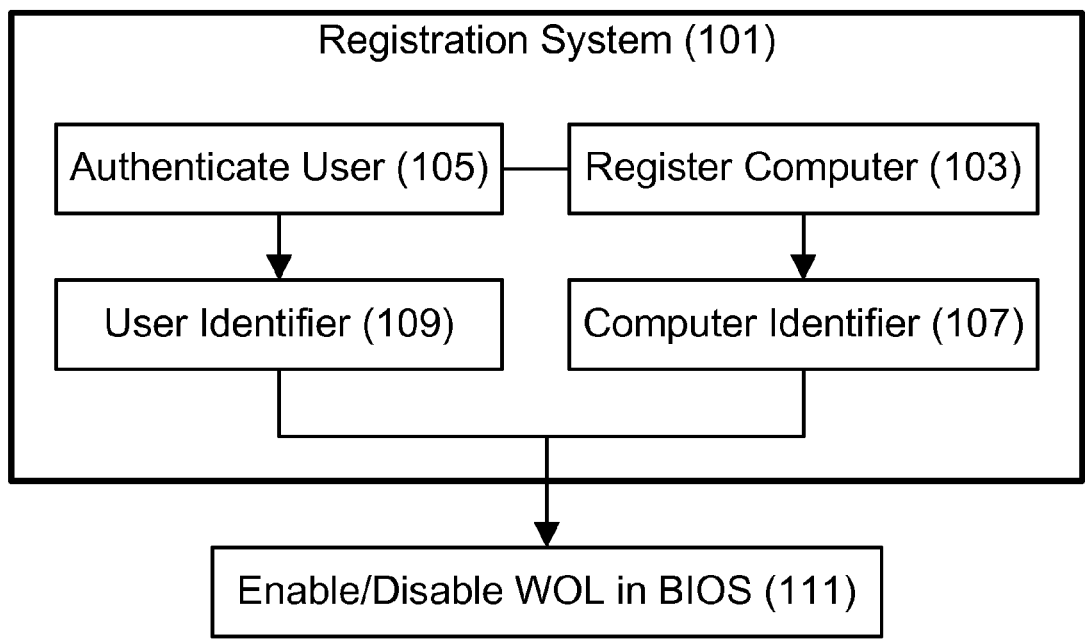
FIG. 1 is a schematic diagram illustrating the functions of the registration system.
Figure 2:
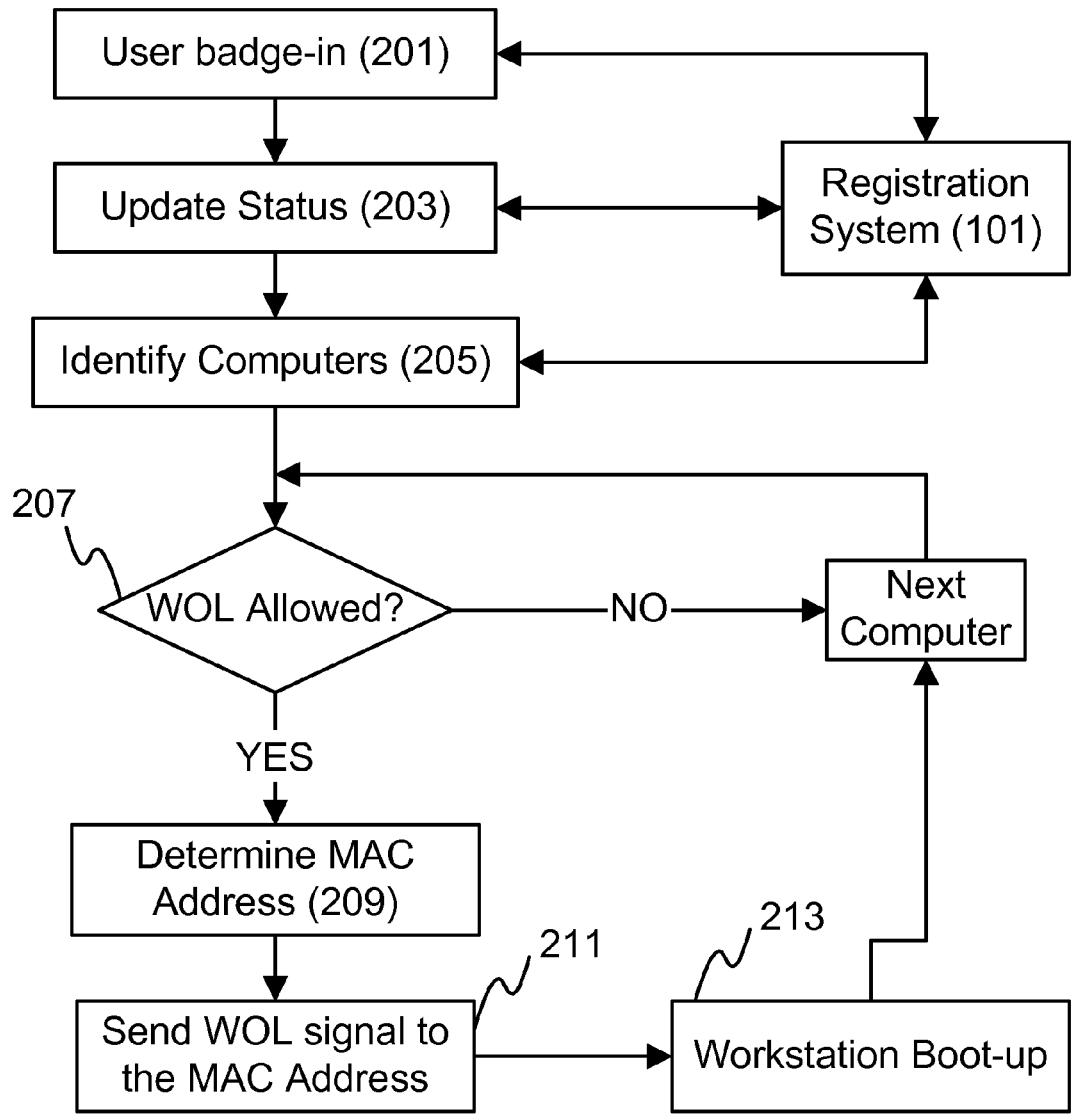
FIG. 2 is a flow diagram demonstrating the processes involved in badging-into the site and automatically issuing boot-up commands to the corresponding workstations.

An embodiment of the invention performs the following steps:

1. Employees register their badge numbers and the MAC addresses of their workstations into the badge security database for the site to enable badge-in WOL service and to configure the badge out preferences (e.g., shutdown, hibernate, sleep mode, no action, etc.). The registration authenticates the employee using the employee's credential (e.g., on the domain), and it takes the MAC address (or any other machine identifier such as the hostname of the machine which may be looked up to determine the MAC address) from the active network interface on the machine used for network connection.

2. Setting the workstation's firmware or BIOS to a WOL-enabled mode.

3. Shutting down the workstation.

4. Employee badging into the site or work area.

5. The badge system is connected to the servers running a database in which the employee registered in step 1.

6. If the serial number of the badge is found in the database, its corresponding MAC address is retrieved. This step includes matching the badge ID to the employee, matching the employee and the site to the workstations associated with the employee on that site, and matching the workstations with their MAC addresses.

7. If any of the workstations associated with the employee on that site is set to be turned on via badging, and the workstation is not excluded by the site administrator (e.g. via an exclusion list of workstations), the server sends a WOL signal packet with the MAC address of the employee's workstation.

8. The employee's workstation powers on and starts a system boot.

9. When the employee exits the site and uses a badge system, the badge ID is matched to the employee, the employee is matched to any groups associated with the employee for this badge-out triggered feature. Then, the employee, any associated groups, and the site are used to match with the workstations associated with the employee on the site. If the association is through a group, the group rules are checked. For example, a group rule might be that all group members badging in that day should badge out before a change setting signal may be sent. The badge-out preferences for the group and/or the workstation is used to determine the eligibility of the workstation and the change setting for the workstation (e.g., shutdown, hibernate, logout, sleep, or no action).

10. For any eligible workstation associated with the employee on that site, that is, the ones that may accept the change setting via badging out mechanism and are not excluded by the site administrator (e.g. not in an exclusion list of workstations), the server sends a signal to the workstation in an attempt to apply the setting determined in previous step. For this signal to be processed, an agent on the workstation listens to the signal from the server to affect the setting.

In one embodiment, a method for integrating a user computer with a badge system is presented. The method comprises of the following steps: a first user registering a first computer (103) located at a site with a registration system (101) in which the badge system controls physical access to the site and in the registering step, a credential of the first user is authenticated (105), a first computer identifier (107) of the first computer is determined, and the first computer identifier and a first user identifier (109) of the user are communicated to the registration system. The first computer identifier is one of computer identifier types comprising: host name type, internet protocol address type, and media access control address type.

In one embodiment, a wake-on-local area network mode is enabled on a firmware or a BIOS of the first computer (111). The first user badges-in at the site to the badge system (201), and the badging system determining a second user identifier of the first user based on the badging-in step. The badging system, then, updates a first presence status (203) of the first user at the site based on the badging-in step and the second user identifier. The badging system generates a badge-in event identifying the first user and the site, and based on the badge-in event, the registration system determines one or more user computers (205) located at the site, associated with the first user, and already registered in the registering step.

In one embodiment, the registration system determines a first eligible subset of the one or more user computers that are not excluded by an administrator for wake-on-local area network (207). The first computer is in the first eligible subset of the one or more user computers. The registration system identifies the first computer and the first computer identifier based on the eligible subset of the one or more user computers. A first media access control address (209) is determined for the first computer based on the first computer identifier.

In one embodiment, the registration system sends a wake-on-local-area-network signal packet (211) tagged with the first media access control address (209) to the first computer, and the first computer boots up (213) to operating system upon receiving the wake-on-local-area-network signal packet.

In one embodiment, the first user badges-out at the site using the badge system. The badging system determines the second user identifier of the first user based on the badging-out step and updates the first presence status of the first user at the site based on the badging-out step and the second user identifier. It further generates a badge-out event identifying the first user and the site. Based on the badge-out event, the registration system determines the one or more user computers located at the site and a second eligible subset of the one or more user computers that are not excluded by the administrator for automatic badging-out process. The first computer is in the second eligible subset of the one or more user computers.

In one embodiment, if the first user and the first computer are associated with a badge-out group, then one or more badge-out group rules associated with the badge-out group mentioned above are determined. Presence statuses of group users belonging to the badge-out group are determined using the badge system. In addition, a change setting action for the first computer in response to the badge-out event is detrained based on the presence statuses of group users, the one or more badge-out group rules, and a group preference setting. The group preference setting is preconfigured for the first computer and is of preference setting type. The preference setting types comprise of shutdown type, hibernate type, logout type, sleep type, lock type, and no-action type.

In one embodiment, if the first user and the first computer are not associated with any badge-out groups, the change setting action is determined based on a user preference setting of the first user for the first computer. The user preference setting is of a type of the preference setting types. The registration system sends a change setting signal to the first computer identifying the change setting action and an agent in the first computer receives the change setting signal and executes the change setting action.

A system, apparatus, or device comprising one of the following items is an example of the invention: workstation, badging system, PC, security module, biometrics, smart cards, IDs, WOL device, LAN, MAC address, BIOS, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of security, badging, office, and computer management.

Any variations of the above teaching are also intended to be covered by this patent application.

The invention claimed is:

1. A method for integrating a user computer with a badge system, said method comprising:

a first user registering a first computer located at a site with a registration system;

wherein said badge system controls physical access to said site;

wherein in said registering step, a credential of said first user is authenticated, a first computer identifier of said first computer is determined, and said first computer identifier and a first user identifier of said user are communicated to said registration system;

wherein said first computer identifier is one of computer identifier types, wherein said computer identifier types comprising: host name type, internet protocol address type, and media access control address type;

enabling a wake-on-local area network mode on a firmware or a BIOS of said first computer;

said first user badging-in at said site to said badge system;

said badging system determining a second user identifier of said first user based on said badging-in step;

said badging system updating a first presence status of said first user at said site, based on said badging-in step and said second user identifier;

said badging system generating a badge-in event identifying said first user and said site;

based on said badge-in event, said registration system determining one or more user computers located at said site, associated with said first user, and registered in said registering step;

said registration system determining a first eligible subset of said one or more user computers that are not excluded by an administrator for wake-on-local area network;

wherein said first computer is in said first eligible subset of said one or more user computers;

said registration system identifying said first computer and said first computer identifier based on said eligible subset of said one or more user computers;

determining a first media access control address for said first computer based on said first computer identifier;

said registration system sending a wake-on-local-area-network signal packet tagged with said first media access control address to said first computer;

said first computer booting up to operating system upon receiving said wake-on-local-area-network signal packet;

said first user badging-out at said site using said badge system;

said badging system determining said second user identifier of said first user based on said badging-out step;

said badging system updating said first presence status of said first user at said site based on said badging-out step and said second user identifier;

said badging system generating a badge-out event identifying said first user and said site;

based on said badge-out event, said registration system determining said one or more user computers located at said site and a second eligible subset of said one or more user computers that are not excluded by said administrator for automatic badging-out process;

wherein said first computer is in said second eligible subset of said one or more user computers;

if said first user and said first computer are associated with a badge-out group, then determining one or more badge-out group rules associated with said badge-out group, determining presence statuses of group users belonging to said badge-out group using said badge system, and determining a change setting action for said first computer in response to said badge-out event based on said presence statuses of group users, said one or more badge-out group rules, and a group preference setting;

wherein said group preference setting is preconfigured for said first computer;

wherein said group preference setting is of a type of preference setting types, wherein said preference setting types comprising: shutdown type, hibernate type, logout type, sleep type, lock type, and no-action type;

if said first user and said first computer are not associated with any badge-out group, determining said change setting action based on a user preference setting of said first user for said first computer;

wherein said user preference setting is of a type of said preference setting types;

said registration system sending a change setting signal to said first computer identifying said change setting action; and an agent in said first computer receiving said change setting signal and executing said change setting action.

* * * * *